United States Patent [19]
Orton et al.

[11] Patent Number: 5,126,396
[45] Date of Patent: Jun. 30, 1992

[54] POLYMERISABLE COMPOSITIONS

[75] Inventors: Michael L. Orton, Northwich; William I. Spurr, Warrington, both of England

[73] Assignee: Imperial Chemical Industries PLC, London, England

[21] Appl. No.: 616,801

[22] Filed: Nov. 20, 1990

Related U.S. Application Data

[63] Continuation of Ser. No. 284,809, Dec. 14, 1988, abandoned, which is a continuation of Ser. No. 143,280, Jan. 7, 1988, abandoned, which is a continuation of Ser. No. 823,113, Jan. 27, 1986, abandoned.

[30] Foreign Application Priority Data

Jan. 25, 1985 [GB] United Kingdom ................ 8501869
Apr. 26, 1985 [GB] United Kingdom ................ 8510667

[51] Int. Cl.$^5$ .................. C08L 67/07; C08L 67/06; C08L 75/16
[52] U.S. Cl. ...................... 525/28; 525/43; 525/440; 525/454; 525/455; 525/920
[58] Field of Search ............ 525/28, 43, 440, 454, 525/455, 920

[56] References Cited

U.S. PATENT DOCUMENTS

| | | | |
|---|---|---|---|
| 3,448,172 | 6/1969 | Damusis et al. | 260/859 |
| 4,254,230 | 3/1981 | Howard | 525/440 |
| 4,324,575 | 4/1982 | Levy | 65/3.11 |
| 4,413,072 | 11/1983 | Hess et al. | 525/440 |
| 4,481,281 | 11/1984 | Tsao et al. | 525/440 |
| 4,503,198 | 3/1985 | Miyai et al. | 525/440 |
| 4,552,932 | 11/1985 | Schollenberger | 525/440 |

FOREIGN PATENT DOCUMENTS

| | | |
|---|---|---|
| 0064809 | 11/1982 | European Pat. Off. |
| 1234684 | 6/1971 | United Kingdom |
| 1324432 | 7/1973 | United Kingdom |
| 1441108 | 6/1976 | United Kingdom |

OTHER PUBLICATIONS

Kirk Othmer, Encyclopaedia of Chemical Technology, Third Edition, vol. 18, pp. 575-584.
Encyclopaedia of Polymer Science and Engineering, 2nd Ed, vol. 12, p. 256.
Webster's Third New International Dictionary "polyester".

Primary Examiner—Ana L. Carrillo
Attorney, Agent, or Firm—Cushman, Darby & Cushman

[57] ABSTRACT

A polymerisable composition which comprises an unsaturated urethane, a $C_1$ or $C_2$ alkyl methacrylate and at least one other ethylenically unsaturated addition polymerisable substance copolymerisable therewith, such polymerisable compositions, where they contain an inorganic filler, overcome some of the problems associated with the polymerisable compositions described in European 0.064,809. Where the polymerisable substance comprises an unsaturated polyester, the shelf-life of the polymerisable composition can be extended by adding thereto a reagent which reacts with a portion of the free carboxyl group in the unsaturated polyester. The compositions may be used, for example, in the production of fibre-reinforced composites.

9 Claims, No Drawings

POLYMERISABLE COMPOSITIONS

This is a continuation of application Ser. No. 07/284,809, filed on Dec. 14, 1988. which was abandoned upon the filing head which is a continuation of Ser. No. 07/143,280, filed Jan. 7, 1988 which is a continuation of Ser. No. 06/823,113, filed Jan. 27, 1986, both now abandoned.

This invention relates to the copolymerisation of unsaturated urethane monomers or oligomers and more particularly to the 'in mould' polymerisation of certain polyurethane polyacrylates and polymethacrylates, and compositions for use therein.

In our European Patent Specification No. 0,064,809A, there are disclosed polymerisable compositions which comprise certain polyurethane polyacrylates or polymethacrylates in combination with methyl methacrylate as comonomer and products prepared by the polymerisation of such compositions.

Where polymerisable compositions comprising an unsaturated urethane and a methacrylate monomer, e.g. as disclosed in European Patent Specification No. 0,064,809A, contain inorganic fillers there is a tendency for the desirable glossy surface of the polymerised products prepared therefrom to deteriorate on storage, which deterioration may occur within hours or may take months to develop and is exacerbated by the use of long polymerisation/demould times, for example of about 10 minutes. The deterioration may take the form of a "chalky" appearance, for example from the presence of micron, or sub-micron, irregularities in the surface of the products or, where the inorganic filler is in the form of fibre reinforcement, by the exacerbation of so-called "fibre-patterning".

We have now found that surprisingly by the incorporation of amounts, e.g. from 5-95% w/w, of one or more copolymerisable substances as hereinafter defined into the polymerisable compositions from which such filled products are prepared the aforesaid deterioration can be at least alleviated. According to the present invention there is provided a polymerisable composition which comprises (a) an unsaturated urethane which is a polyurethane polyacrylate or polymethacrylate resin derived from a hydroxyalkyl acrylate or methacrylate by reaction of the hydroxyl groups thereof with the isocyanate groups of
  (i) a polyisocyanate free from urethane groups and having a number average isocyanate functionality of at least 2.0 and preferably greater than 2.0 or
  (ii) a urethane polyisocyanate derived from a polyisocyanate by reaction thereof with the hydroxyl groups of a polyhydroxy compound, the said urethane polyisocyanate having a number average isocyanate functionality of at least 2.0 and preferably greater than 2.0;
(b) a suitable methacrylate monomer of general formula

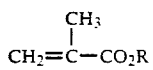

where R is a hydrocarbyl group containing one or two carbon atoms; and
(c) at least one other ethylenically unsaturated addition polymerisable substance as hereinafter defined.

The hydroxyalkyl acrylate or methacrylate from which the unsaturated urethane is derived preferably contains from 2 to 4 carbon atoms in the hydroxyalkyl group; 2-hydroxyethyl and 2-hydroxypropyl acrylates and methacrylates are especially preferred.

When the unsaturated urethane is derived from a urethane polyisocyanate the latter is preferably a urethane polyisocyanate which is in turn derived by reaction of a polyhydroxy compound with a polyisocyanate which itself preferably has a number average isocyanate functionality greater than 2.0.

The polyisocyanates especially preferred both for direct reaction with the hydroxyalkyl acrylate or methacrylate and for preparation of an intermediate urethane polyisocyanate, are polymethylene polyphenyl polyisocyanates. However, we do not exclude the possibility that where a urethane polyisocyanate is used it may be derived from an alternative aromatic isocyanate, e.g. a toluene di-isocyanate, or even an aliphatic or alicyclic isocyanate, e.g. hexamethylene di-isocyanate or 4,4'-(di-isocyanato)-dicyclohexylmethane, or isophorone di-isocyanate.

The isocyanate functionality (i.e. average number of isocyanate groups per molecule) of the polyisocyanate (or the urethane polyisocyanate) employed is particularly preferably at least 2.2, and more particularly preferably is in the range from 2.5 to 3.0. The polyisocyanate may be an individual polyisocyanate or may be a mixture of polyisocyanates having an average functionality as specified herein.

When the urethane polyisocyanate is derived from a di-isocyanate (for example diphenylmethane-4,4'-di-isocyanate or other aromatic di-isocyanate) and where it is desired that the urethane polyisocyanate has an isocyanate functionality of greater than 2.0 reaction of the di-isocyanate with a polyhydroxy compound containing more than two hydroxyl groups will be necessary in order to yield a urethane polyisocyanate having the desired isocyanate functionality of greater than 2.0.

Suitable polyhydroxy compounds from which the unsaturated urethane may be derived include those conventionally used in the art for producing urethanes by reaction of a polyhydroxy compound with an isocyanate. Preferably the polyhydroxy compound is a diol or triol, although we do not exclude the possibility that it may contain more hydroxy groups, for example up to six.

Suitable diols include glycols of the formula HO-Q-OH, where Q is an alkylene or polyalkylene ether radical; dihydric phenols and bis-phenols for example 2,2-bis(4-hydroxyphenyl) propane (Bisphenol A) and bis(4-hydroxyphenyl) sulphone (Bisphenol S), and ethoxylated and propoxylated derivatives thereof.

Suitable triols include glycerol, trimethylol propane (1,1,1-tris (hydroxymethyl)-propane) and ethoxylated or propoxylated derivatives thereof.

Where a urethane polyisocyanate is used in the preparation of the unsaturated urethane it may also contain a proportion of one or more polyurethanes of higher molecular weight derived by reaction of the above product with further molecules of polyhydroxy compound and polyisocyanate.

In the preparation of a urethane polyisocyanate with an isocyanate functionality of greater than 2.0, the proportions of polyisocyanate and polyhydroxy compound are chosen so that all the hydroxyl groups of the polyhydroxy compound are converted into urethane groups. Consequently the isocyanate functionality of the urethane polyisocyanate will be greater than the isocyanate functionality of the polyisocyanate used as starting material. Thus for example, if the polyisocyanate starting material has a functionality (n) of 2.5 the isocyanate functionality of the urethane polyisocyanate derived from a diol will be $2n - 2 = 3.0$.

Whichever particular polyhydroxy compound is used, the relative proportions of polyhydroxy compound and polyisocyanate and/or the isocyanate functionality of the polyisocyanate is chosen so as to yield the required isocyanate functionality in the urethane polyisocyanate.

The unsaturated urethanes which are used in polymerisable compositions according to the present invention may be prepared by reaction of the hydroxyalkyl acrylate or methacrylate with polyisocyanate (or urethane polyisocyanate) of functionality of at least 2.0 using methods conventional in the art for the preparation of polyurethanes.

Mixtures of two or more hydroxyalkyl acrylates and/or methacrylates may be used if desired.

The relative proportions of the reactants employed are preferably such as to provide at least 1 mole of the hydroxyalkyl acrylate or methacrylate per isocyanate group. Excess (unreacted) hydroxyalkyl acrylate or methacrylate is in general not objectionable in the reaction product since any such excess monomer may in many cases simply be incorporated in the copolymer produced in the subsequent copolymerisation process. The extent of any excess of hydroxyalkyl acrylate or methacrylate will therefore be determined in practice by economic considerations and the desirability of otherwise of incorporating the particular hydroxyalkyl acrylate or methacrylate in the final copolymer.

Catalysts used in the reaction between the hydroxyalkyl acrylate or methacrylate and the polyisocyanate (or urethane polyisocyanate) may be those known in the art of polyurethane production, for example tertiary amines and metal salts, especially di-n-butyltin dilaurate.

The reaction between the hydroxyalkyl acrylate or methacrylate and the polyisocyanate (or urethane polyisocyanate) is preferably carried out in the presence of an inert liquid diluent. A wide range of diluents may be used but most conveniently, in order to avoid the need for separation of the unsaturated urethane, the reaction is carried out in the presence of the suitable methacrylate monomer as diluent.

Preferably the suitable methacrylate monomer is methyl methacrylate.

The relative proportions of the unsaturated urethane and the suitable methacrylate monomer to be copolymerised therewith will depend upon the required properties of the copolymer product and upon the copolymerisation conditions to be employed. In general the proportion of the unsaturated urethane is preferably in the range from 10 to 90 (for example from 30 to 80, especially from 40 to 60) parts by weight per hundred total parts of unsaturated urethane plus suitable methacrylate monomer.

The at least one ethylenically unsaturated addition polymerisable substance used in polymerisable compositions according to the present invention (a) contains at least one ethylenically unsaturated group, (b), is copolymerisable with the mixture of the unsaturated urethane compound and suitable methacrylate monomer and (c) has a polymerisation reactivity, both with the aforesaid mixture and itself, such that the concentration of the suitable methacrylate monomer at demould of the product prepared on polymerisation of a polymerisable composition according to the present invention is less than the concentration of the suitable methacrylate monomer which would obtain on polymerisation of the polymerisable composition in the absence of the at least one ethylenically unsaturated addition polymerisable substance from the polymerisable composition (hereinafter referred to for convenience as "copolymerisable substance").

As examples of suitable copolymerisable substances may be mentioned inter alia unsaturated esters, aromatic vinyl compounds or preferably unsaturated polyesters which may be present as a composition in a suitable copolymerisable solvent therefor, e.g. styrene. By the term "vinyl" we mean the group $CH_2=C(R^1)-$ where $R^1$ is hydrogen or hydrocarbyl.

Suitable unsaturated esters include, with the aforementioned proviso, esters having the structure $CH_2=C(R^2)COOR^3$ where $R^2$ is, for example, hydrogen or methyl and $R^3$ is, for example, hydrogen or an alkyl group having at least 3 carbon atoms or a heterocyclic ring, e.g. tetrahydrofurfuryl, or $CH_2=C(R^2)COOQOOCC(R^2)=CH_2$, where Q has the meaning hereinbefore ascribed to it, or the poly (meth) acrylate esters of polyhydroxy compounds.

Suitable aromatic vinyl compounds include, for example, styrene and derivatives thereof, for example alkyl derivatives of styrene, e.g. vinyl toluene.

The copolymerisable substance may be the reaction product of a (meth)acrylic acid with a bis(glycidyl ether) of a bisphenol; such reaction products are described in U.S. Pat. No. 3066112 and 4131729, e.g. of formula

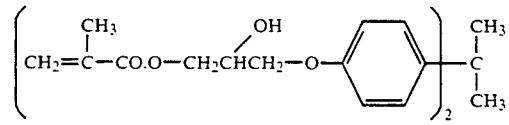

The copolymerisable substance may be an allyl urethane, for example prepared by the reaction of allyl alcohol with a polyisocyanate.

The copolymerisable substance may be the reaction product of a (meth)acryloyl halide, e.g. chloride, with a diol derived by ethoxylation and/or propoxylation of a bisphenol as described in U.S. Pat. No. 2890202, e.g. of formula

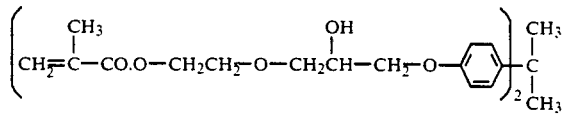

The copolymerisable substance preferably comprises an unsaturated polyester. The unsaturated polyester may be, for example, a general purpose or a speciality polyester, e.g. it may be derived from (a) maleic acid and/or fumaric acid, (b) phthalic and/or isophthalic acid and/or terephthalic acid and (c) ethylene glycol and/or propylene glycol and (d) alkoxylated bisphenols. Unsaturated polyesters prepared from various combinations of the aforesaid components, covering a range of molecular ratios, are well known in the art.

For convenience the copolymerisable substance comprises a mixture of an unsaturated polyester and styrene, typically in a weight ratio in the range of from about 5:1 to 1:4, e.g. about 2:1, since we have found that, after demould, the rate at which the Barcol Hardness/stiffness increases may be increased in products which are prepared by the polymerisation of polymerisable compositions which contain such a mixture, particularly where the unsaturated urethane is prepared from a polyisocyanate and a diol of formula HO—Q¹—OH where Q¹ is a polyalkylene ether radical, or a triol, e.g.

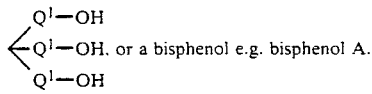

Where the copolymerisable substance used in polymerisable compositions according to the present invention comprises an unsaturated polyester/styrene we have found that products produced by polymerisation of such polymerisable compositions surprisingly often have improved mechanical properties, e.g. tensile modulus, and yield stress; and, particularly where the unsaturated urethane is derived from a urethane polyisocyanate which itself is derived from a polyether, the products, at demould, have higher Barcol Hardness which, surprisingly, further increases more rapidly than that of products from polymerisable compositions lacking an unsaturated polyester. The rate of increase in Barcol Hardness is particularly surprising since it increases faster than in polymerisationproducts from unsaturated polyester/styrene compositions or from unsaturated urethane/methyl methacrylate compositions separately.

The concentration of the copolymerisable substance in polymerisable compositions according to the present invention is between 5 and 95% w/w, preferably between 10 and 80% w/w and more preferably between 15 and 60% w/w based on the total weight of unsaturated urethane, suitable methacrylate monomer and copolymerisable substance. Although we do not exclude the possibility that concentrations outside this range may be used.

Preferably the copolymerisable substance is added to a mixture of the unsaturated urethane and suitable methacrylate monomer.

Where the aforesaid copolymerisable substance comprises an unsaturated polyester composition and polymerisation of the polymerisable composition according to the present invention is initiated by an amine accelerated decomposition of a peroxide, the fabricator or manufacturer of cured products often finds it convenient to premix the amine accelerator, e.g. dimethyl-p-toluidine, with the polymerisable composition comprising an unsaturated ester composition to form an accelerated mixture and then to add the peroxide to the accelerated mixture shortly before it is desired to initiate polymerisation. However, the shelf-life of such accelerated mixtures tends to be unacceptably short.

Unsaturated polyester compositions, particularly those which are commercially available, often contain a small quantity of carboxylic acid groups, equivalent to a few tens of milligrams of potassium hydroxide per gram, say. We have now found that where polymerisable compositions according to the present invention contain an unsaturated polyester composition and an amine accelerator therefor, the shelf-lives of such polymerisable compositions may be increased by incorporating therein a sufficient amount of a suitable reagent to react with a certain proportion of the aforesaid carboxylic acid groups in the polyester.

According to a further aspect of the present invention there is provided a polymerisible composition which comprises
(a) an unsaturated urethane which is a polyurethane polyacrylate or polymethacrylate resin derived from a hydroxyalkyl acrylate or methacrylate by reaction of the hydroxyl groups thereof with the isocyanate groups of
  (i) a polyisocyanate free from urethane groups and having an isocyanate functionality of at least 2.0 or
  (ii) a urethane polyisocyanate derived from a polyisocyanate by reaction thereof with the hydroxyl groups of a polyhydroxy compound, the said urethane polyisocyanate having an isocyanate functionality of at least 2.0;
(b) a suitable methacrylate monomer as hereinbefore defined;
(c) an unsaturated polyester composition;
(d) at least one accelerator for accelerating the decomposition of organic peroxides; and
(e) a sufficient quantity of a suitable reagent to react with at least 25% of the carboxylic acid groups in the unsaturated polyester composition.

The suitable reagent to react with the carboxylic acid groups in the unsaturated polyester may be inorganic or organic. As examples of such suitable reagents may be mentioned alcohols, isocyanates, alkali metal hydroxides, ammonia, suitable carbonates, e.g. calcium carbonate, or preferably amines, e.g. triethylamine, and diethylamine.

Whilst we do not exclude the possibility that the aforesaid reagent may be added in excess it is often preferred that it is used in sufficient quantity to react with between 45% and 95% of the carboxylic acid groups present in the unsaturated polyester.

The carboxylic acid groups of the unsaturated polyester may be reacted prior to being added to the mixture of unsaturated urethane and suitable methacrylate monomer. Preferably, however, the aforesaid carboxyl groups are neutralised after addition of the unsaturated polyester, or solution thereof, to the aforesaid mixture.

The temperature at which reaction of the carboxylic acid groups with the suitable reagent is effected depends on the nature of the reagent used. For example sodium hydroxide and triethylamine may be used at room temperature; calcium carbonate may be used at about 40°-50° C.

Amine accelerators for catalysing the decomposition of organic peroxides are well known in the art of bulk polymerisation, typically they are tertiary aromatic amines, e.g. N,N-dimethylaniline, or preferably N,N-dimethyl-p-toluidine. We do not exclude the possibility that where an amine is used to neutralise the carboxylic acid groups, it may be added in sufficient excess to act as accelerator particularly where long gelation times, say of the order of 40 minutes, are required.

The concentration of the amine accelerator in polymerisable compositions according to the present invention is typically in the range from 0.1% to 0.8% w/w.

By "peroxide" for use in the present invention we mean an organic peroxide having the formula

in which the groups R⁴, which may be the same or different, are hydrogen, alkyl, aryl or acyl groups, no more than one of the groups $R^4$ being hydrogen. The term acyl groups means groups having the formula $$R^5—CO—$$

in which $R^5$ is an alkyl, aryl, alkoxy or aryloxy group or substituted derivatives thereof. A preferred peroxide is dibenzoyl peroxide or a derivative thereof, e.g. 4,4'-dichloro-dibenzoyl peroxide.

Where an inorganic filler is present in polymerisable compositions according to the present invention it may be present in particulate, plate-like or fibrillar form. Suitable fillers include silica, calcium carbonate, talc, alumina trihydrate, mica, various clays and vermiculite. Glass fibre, either in continuous or chopped strand form or, for example, of aspect ratio from 10/1 to 500/1 (especially from 20/1 to 300/1) may be used as filler. It will be appreciated that where the inorganic filler, where used, is carboxylic acid-reactive a portion thereof may be used to neutralise the polyester.

Where an inorganic filler is present in polymerisable compositions according to the present invention the weight ratio of total polymerisable material to inorganic filler is typically in the range from 3:1 to 1:3 and often is about 1.1.

When an inorganic filler is used a suitable "coupling agent" may in some cases advantageously be incorporated to link the filler to the polymer matrix. Thus, for example, when the filler is silica a suitable silane coupling agent may be incorporated, for example γ-methacryl-oxypropyltrimethoxysilane.

Organic polymers, especially thermoplastic polymers, may also be incorporated in polymerisable compositions according to the present invention. One or more organic polymers may either be dissolved in the reaction mixture or added in particulate form, with or without the incorporation of inorganic fillers as already described. Polymers which may be incorporated include polymers and copolymers of alkyl acrylates and/or methacrylates (especially of acrylates and/or methacrylates containing from 1 to 8 carbon atoms in the alkyl group, for example methyl methacrylate); polymers and copolymers of styrene and α-methylstyrene (for example copolymers of styrene with butadiene); polymers and copolymers of acrylonitrile, and polymers and copolymers of vinyl acetate (for example copolymers of vinyl chloride with vinyl acetate). Incorporation of such polymers is often useful in reducing in-mould shrinkage.

In general, the proportion of organic polymer incorporated may be, for example, from 1 to 25 parts by weight (especially from 3 to 10 parts) per 100 parts of unsaturated urethane/suitable methacrylate monomer mixture, the upper limit depending upon the desired viscosity of the mixture and the desired mechanical properties of the final product.

Other additives such as plasticisers and colourants known in the art may also be incorporated into polymerisable compositions according to the present invention.

The polymerisation of polymerisable compositions according to the present invention may be carried out using techniques well known in the art of bulk polymerisation. A wide range of polymerisation initiators and concentrations thereof may be used, depending upon the desired temperature and rate of polymerisation. The catalyst may be, for example, a peroxide catalyst which may be heat activated or which may be used in conjunction with an accelerator, e.g. a tertiary amine.

A suitable combination in many cases for moulding temperatures less than 80° C is, for example, dibenzoyl peroxide in conjunction with N,N-dimethylaniline or N,N-dimethyl-para-toluidine.

A particularly desirable use for polymerisable compositions according to the present invention is for the production of fibre-reinforced composites, especially glass-fibre-reinforced composites, by automated processes.

In such processes, for example closed mould processes using matched male and female moulds, glass fibre reinforcement (which may be chopped strand mat, continuous filament mat, woven continuous filament mat or any other variation of mat) is placed in one half of the mould, the mould is closed and resin is caused to flow through and wet-out the glass-fibre reinforcement either by sucking resin through by applying a vacuum to the closed mould cavity, or by pumping the resin through, or by a combination of vacuum-assisted pumping. Alternatively, liquid resin may be placed in the female half of the mould and the act of mould closure itself causes the resin to flow through the glass fibre.

For improved efficiency and speed in such processes it is advantageous that the resin shall flood and wet-out the fibrous reinforcement rapidly, shall minimise "washing" of glass fibre (a term used in the industry to describe movement of glass-fibre caused by the flow of resin), and shall flow through the fibrous reinforcement under the minimum of pressure. These advantages are more readily obtained when the resin has low viscosity. Furthermore, it is desirable that, once the mould cavity is filled with resin, the resin shall polymerise rapidly to a product stiff enough and strong enough to be demoulded. It is an advantage of the polymerisable compositions according to the present invention that they often have very low viscosities and may be used without compromising the rapid polymerisation characteristics.

In general, for use in the applications hereinbefore described it is preferred that the viscosity of the mixture of unsaturated urethane, suitable methacrylate monomer and copolymerisable substance is not above 500 centipoise; it is particularly preferred that the viscosity is not above 250 centipoise; and it is more particularly preferred that the viscosity is in the range from 25 to 150 centipoise since such viscosities lead to the advantages hereinbefore described. (Viscosities through-out this specification are as measured at 20° C. with a Brookfield viscometer at 60 rpm; 1 centipoise = 1 mPa.s). However, we do not exclude the possibility that higher viscosities may be used in other applications.

The relatively low solution viscosities which can be achieved with unsaturated urethane/suitable methacrylate monomer/copolymerisable substance compositions confer an additional advantage in that relatively high loadings of inorganic fillers can be included whilst maintaining the advantageous processing features described before which result from a low viscosity resin.

In such moulding processes, it is often desirable that the time required for polymerisation is less than 15 minutes, preferably 5 minutes or less (if possible less than 2 minutes). It is also often desirable that such rapid polymerisation may be achieved at ambient temperatures or at temperatures not greatly elevated above ambient, for example at initial mould temperatures of 80° C. or below.

Polymerisable compositions according to the present invention may also be used in compression moulding processes, for example as dough moulding compounds or sheet moulding compounds. In such processes, the moulding temperature is typically less than 140° C. and preferably is between 100° C. and 130° C. and demoulding may be effected in less than 3 minutes and often effected in less than 1 minute.

Polymerisable compositions according to the present invention can also be used in pultrusion processes. Such processes are typically carried out at less than 200° C.

The invention is illustrated by the following Examples.

EXAMPLES 1-4

These examples illustrate the use of a mixture of unsaturated polyester and styrene as copolymerisable substance in polymerisable compositions according to the present invention.

PREPARATION OF UNSATURATED URETHANE/METHYL METHACRYLATE

A polyisocyanate having an average functionality of 2.6 (Suprasec (RTM) DND, ex ICI: 354 grams), a propoxylated glycerol end-capped with ethylene oxide and having a molecular weight of about 6000 (Daltocel (RTM) F2805, ex ICI; 240 grams), 2-hydroxyethyl methacrylate (338.5 grams) and methyl methacrylate (900.3 grams) were mixed and stirred under nitrogen. Dibutyl tin dilaurate (7 grams) was added with stirring and the reaction temperature rose to 70° C. After 2 hours the isocyanate concentration had fallen to below 2000 ppm. A mixture of an unsaturated urethane and methyl methacrylate, in approximately 1:1 weight ratio, was obtained as a brown liquid, (hereinafter referred to for convenience as Resin A).

COPOLYMERISABLE SUBSTANCE

The copolymerisable substance was a polyester resin which was a mixture of a general purpose unsaturated polyester and styrene, in weight ratio 2:1 (Crystic (RTM) 196, ex Scott-Bader), (which mixture is hereinafter referred to for convenience as CSI).

The polyester resin was titrated with potassium hydroxide according to BS 2782, Part 4, Method 432B and was found to have an acid value of 19 mg KOH/gram.

POLYMERISABLE COMPOSITIONS

Polymerisable compositions were prepared by mixing portions of Resin A and portions of CSI as shown in table 1 in predetermined ratios.

Benzoyl peroxide and N,N-dimethyl-p-toluidine were added to samples (15 grams) of the polymerisable compositions to give concentrations of 1.5% w/w and 0.5% w/w respectively. The samples were then initiated at 15° C. The results are given in Table 1.

TABLE 1

| Example No. | Concentration of copolymerisable substance (% w/w) | Peak Time (secs) | Peak Temperature (°C.) |
|---|---|---|---|
| 1 | 25 | 330 | 176 |
| 2 | 20 | 330 | 178 |
| 3 | 15 | 315 | 176 |
| 4 | 10 | 285 | 177 |

TABLE 1-continued

| Example No. | Concentration of copolymerisable substance (% w/w) | Peak Time (secs) | Peak Temperature (°C.) |
|---|---|---|---|
| C.T. | 0 | 210 | 177 |

CT: Comparative test using the unsaturated urethane/methyl methacrylate mixture; i.e. Resin A The constancy of the peak temperatures shown in Table 1 illustrates that the copolymerisable substance is being incorporated by polymerisation into the product of the reactions.

EXAMPLE 5

This example illustrates the use of styrene as copolymerisable substance in polymerisable compositions according to the present invention.

The preparation of the unsaturated urethane/methyl methacrylate mixture as described in Examples 1-4 was repeated except that a portion of the methyl methacrylate was replaced with styrene; a polymerisable composition was obtained in which the weight ratio of unsaturated urethane: methyl methacrylate: styrene was 10:9:1.

Curing of a sample of the polymerisable composition under the conditions described in Example 1 indicated a gel time of 160 seconds, a peak time of 270 seconds, a gel-peak time of 110 seconds and a peak temperature of 173° C.

EXAMPLE 6

This example illustrates the use of a polymerisable composition according to the present invention which comprises tetrahydrofurfuryl methacrylate as copolymerisable substance and which contains an inorganic filler. The preparation of Resin A was repeated except that tetrahydrofuryl methacrylate (1350 grams) was used instead of methyl methacrylate.

A portion of (2.5 grams) of the product so produced was mixed with a portion (7.5 grams) of Resin A.

Ground calcium carbonate, having a mean particle size of 2 microns, was incorporated into the polymerisable composition to give a weight ratio of inorganic to organic of 1:1.

The mixture was then initiated at 20° C. with benzoyl peroxide and N,N-dimethyl-p-toluidine. The product had a glossy appearance and remained glossy for 2 days.

EXAMPLES 7-11

These examples illustrate the use of polymerisable compositions according to the present invention which contain a filler and illustrate the rate of increase of Barcol Hardness.

In these examples, portions of Resin A were mixed with portions of CSI.

Ground calcium carbonate, having a mean particle size of 2 microns, was incorporated into the polymerisable compositions in Examples 7-11 to give a weight ratio of inorganic to organic of 1:1.

Samples were then initiated at 20° C. with benzoyl peroxide and N,N-dimethyl-p-toluidine.

The results are shown in Table 2.

EXAMPLES 12

This example illustrates the appearance of a product prepared by polymerisation of polymerisable compositions according to the present invention in which the copolymerisable substance is styrene.

A portions of the polymerisable composition prepared in Example 5 was used.

To 1 part by weight of the polymerisable composition was added 1 part by weight of the calcium carbonate described in Examples 6-11.

Polymerisation of portions of the filled polymerisable compositions was initiated with a mixture of 1.5% benzoyl peroxide and 0.5% N,N-dimethyl-p-toluidine. The product remained glossy overnight.

EXAMPLE 13

This example illustrates the increase in Flexural modulus and flexural strength in a product prepared by polymerisation of a polymerisable composition according to the present invention.

Example 3 was repeated and the mechanical properties of the product were measured. The results are shown in Table 3.

37.8° C. The times to gelation were noted. The results are given in Table 4.

TABLE 4

| Example No | Polymerisable Composition Weight (grams) | Weight of DMPT (grams) | Time to Gelation (days) 20° C. | 37.8° C. |
|---|---|---|---|---|
| 14 | 100 | 0.5 | a | 50 |
| 15 | 200 | 0.5 | 6 | 50 |
| CT | A 100 | 0.5 | 2 | 1 | a: Not determined.
CT: Comparative test; Resin A (100 grams) was mixed with the unsaturated polyester composition CSI (15 grams)
DMPT: N,N-dimethyl-p-toluidine.

EXAMPLES 16-22

These examples illustrate the affects of unsaturated polyesters of a variety of compositions on free methyl methacrylate concentration in products prepared from polymerisable compositions according to the present

TABLE 2

| | Weight Ratio | | | Barcol Hardness | | | Surface Appearance | | |
|---|---|---|---|---|---|---|---|---|---|
| Example No. | Unsaturated Urethane/ Methyl Methacrylate Mixture | Copolymerisable Substance | Polymerisation Initiator | Demould | 30 Minutes | 2 Days | Demould | Overnight | 2 Days |
| 7 | 3 | 1 | A | 25 | 40 | 56 | glossy | glossy | glossy |
| 8 | 3 | 1 | B | 28 | 48 | 58 | " | " | " |
| 9 | 4 | 1 | A | 20 | 40 | 50 | " | " | " |
| 10 | 5.67 | 1 | A | 20 | 40 | 50 | " | " | " |
| 11 | 9 | 1 | A | 15 | 30 | 45 | " | " | " |
| CT1 | 1 | 0 | A | 0 | 9 | 40 | " | chalky | chalky |
| CT2 | 1 | 0 | B | 5 | 38 | 49 | " | " | " |

CT1 and CT2: Comparative tests.
A: 1% Benzoyl peroxide and 0.2% N,N-dimethyl-p-toluidine based on polymerisable material.
B: 1.5% Benzoyl peroxide and 0.5% N,N-dimethyl-p-toluidine based on polymerisable material.

TABLE 3

| | At Demould | | | After Post-curing[a] | |
|---|---|---|---|---|---|
| Ex No | Impact Strength kJ/m² | Flexural Strength mPa | Flexural Modulus GPa | Flexural Strength mPa | Flexural Modulus GPa |
| 13 | 20 | 122 | 2.69 | 127 | 2.79 |
| CT | 19 | 104 | 2.32 | 125 | 2.70 | a: Post-cured at 110° C. for 1 hour
CT: Comparative test of polymerisable composition containing no copolymerisable substance

EXAMPLES 14-15

These examples illustrate the improvement in shelf life of polymerisable compositions according to the present invention in which the copolymerisable substance comprises an unsaturated polyester in which the carboxylic acid groups have been neutralised with triethylamine and calcium carbonate respectively.

In Example 14 triethylamine (6.84 grams) was added over two minutes with stirring to a portion of CSI(200 grams). A portion (800 grams) of Resin A was then added and stirring was continued until a homogeneous solution was obtained.

In Example 15 Calcium carbonate powder (Durcal 5 (RTM); 100 grams) was added with stirring to a mixture of a portion (15 grams) of CSI and a portion (85 grams) of Resin A.

Portions of the compositions prepared in Examples 14 and 15 were mixed with N,N-dimethyl-p-toluidine, one sample of each portion was stored at room temperature and a further sample of each portion was stored at invention.

The unsaturated polyesters were separately mixed with portions of Resin A. Triethylamine was added to some of the mixtures to neutralise a portion of the acidity in the unsaturated polyester. The composition of the polymerisable compositions and the appearance thereof are given in Table 5. The polymerisable compositions were then polymerised, under two different conditions.

GENERAL PRODCEDURE A

Di-benzoyl peroxide (1.00 gram of a 60 w/w solution in plasticiser) was dissolved in the polymerisable composition (60 gram); N,N-dimethyl-p-toluidene (0.12 gram) was then quickly added. The mixture was quickly poured into a cell consisting of two glass plates which had been treated with mould release wax separated by a 3 mm thick silicone rubber gasket.

The polymerised product was demoulded 10 minutes after peak exotherm and immediately cut into small samples (approximately 1.5 cm ×0.5 cm), the samples which came from the edges of the product were rejected. Portions (weighing approximately 3.6 grams) were accurately weighed into a 25 ml volumetric flask. the volume was made up with an accurately weighed portion of chloroform (typically 32.4 grams) and the flask was stoppered.

The chloroform/sample mixture was allowed to stand with occasional shaking for 4 days, then chlorobenzene (approximately 0.2 g) was accurately added as internal standard. The residual methyl methacrylate and styrene were determined by gas liquid chromatography; the chromatograph was calibrated with standard solutions of methyl methacrylate, styrene and chlorobenzene. An equal partitioning of residual methyl methacrylate and styrene between swollen product and chloroform was assumed in calculating the total residual amounts in the product before swelling.

GENERAL PROCEDURE B

Procedure (a) was repeated except that benzoyl peroxide paste (1.50 gram was used instead of 1.00 gram) and N,N-dimethyl-p-toluidene (0.30 gram was used instead of 0.12 grams).

The results from General Procedures (A) and (B) are shown in Table 6.

EXAMPLE 23

This example illustrates the use of the methacrylate diester of 2,2¹-[isopropylidene bis (p-phenyleneoxy)] diethanol as copolymerisable substance.

A composition consisting of 80 parts by weight of resin A, as prepared in Example 1, was mixed with 20 parts by weight of the diester. The mixture was polymerised and the polymer was analysed using procedure (b) in Examples 16–22.

The polymer was clear and was found to contain 3.7% w/w unreacted methyl methacrylate compared with 5.4% w/w in the comparative example not containing the copolymerisable substance.

EXAMPLE 24

This example illustrates the use of an allylically unsaturated urethane as copolymerisable substance. The copolymerisable substance was made in situ in Resin A (as prepared in example 1) by the following procedure. 160 grams of Resin A were charged to a 1 liter flask fitted with a stirrer. To this were added with stirring 11.85 grams allyl alcohol and 27.9 grams of a 'Suprasec' (RTM) DND (ex ICI), a polyisocyanate of isocyanate functionality 2.6.

TABLE 5

| Example No | Unsaturated Urethane % w/w | Methyl methacrylate % w/w | Copolymerisable substance | | | | Styrene % w | T p.h.r. | Appearance of mixture |
| | | | Unsaturated Polyester | | | | | | |
| | | | % w/w | Type: Ratio | | | | | |
| | | | | M: | O: | I | | | |
| CT | 50 | 50 | 0 | | | | 0 | 0 | clear |
| 16 | 40 | 40 | 13.3 | 1: | 1: | 0 | 6.7 | 0.50 | clear |
| 17 | 42.65 | 42.65 | 14.3 | 1: | 1: | 0 | 0.4 | 0.53 | clear |
| 18 | 40 | 40 | 12.8 | 3: | 1: | 0 | 7.2 | 0.50 | clear |
| 19 | 40 | 40 | 12.4 | 3: | 0: | 1 | 7.6 | 0.65 | clear |
| 20 | 40 | 40 | 13.0 | 1: | 0: | 0 | 7.0 | 0.60 | hazy |
| 21 | 40 | 40 | 14.0 | 2: | 1: | 0 | 6.0 | 0.79 | clear |
| 22 | 12.5 | 12.5 | 52.5 | 2: | 1: | 0 | 22.5 | 0 | clear |

CT: Comparative Test
M: maleic acid
O: orthophthalic acid
I: isophthalic acid
T: triethylamine

TABLE 6

| | Procedure (a) | | Procedure (b) | | |
| Example | Residual MMA % w/w | Residual Styrene % w/w | Residual MMA % w/w | Residual Styrene % w/w | Appearance of product |
| --- | --- | --- | --- | --- | --- |
| CT | 6.3 | 0.00 | 5.4 | 0.00 | clear |
| 16 | 3.9 | 0.03 | 2.5 | 0.02 | clear |
| 17 | 2.1 | 0.00 | 1.8 | 0.00 | clear |
| 18 | 4.3 | 0.04 | 3.2 | 0.02 | slightly hazy |
| 19 | | | 3.2 | 0.02 | clear |
| 20 | 6.1 | 0.06 | 3.9 | 0.03 | hazy |
| 21 | | | 3.2 | 0.02 | clear |
| 22 | | | 0.7 | 0.80 | slightly hazy |

From Table 6 it can be seen that under the conditions of procedure (b) all the unsaturated polyesters examined reduced the free methyl methacrylate concentration in the product.

Dibutyl tin ailaurate catalyst was present in the Resin A component and the reaction mixture exothermed to about 50° C. The mixture was allowed to cool to ambient temperature. A portion of this resin was polymerised and the polymer analysed for unreacted methylmethacrylate using procedure (b) in Examples 16–22.

The polymer was clear and was found to contain 3.2% w/w unreacted methyl methacrylate compared with 5.4% w/w in the comparative example not containing the copolymerisable substance.

EXAMPLE 25

An unsaturated urethane/methyl methacrylate resin was prepared in the following way.

300 gram methyl methacrylate containing 60 ppm hydroquinone as polymerisation inhibitor were charged to a 1 liter flash fitted with a stirrer, a thermometer and a dropping funnel. 100 gram of a polyisocyanate having a number average functionality of 2.6 ('Suprasec' DND (RTM) ICI), 2.0 gram of dibutyl tin dilaurate and 45 miligram benzoquinonewere added to the flask and the mixture stirred until homogeneous. 100 gram of 2 hydroxyethyl methacrylate containing approximately 300 ppm paramethoxyphenol as polymerisation inhibitor, were added slowly via the dropping funnel to the stirred content of the flask adjusting the rate of addition such that the temperature in the flask did not exceed 75° C. After addition of all the hydroxyethyl methacrylate the contents of the flask were allowed to cool to ambient temperature. The resin product was used for further experiments when the isocyanate concentration had fallen below 2000 ppm. For convenience this resin is referred to as Resin B.

80 grams of resin B were mixed with 20 gram of a copolymerisable substance which was an unsaturated polyester resin which itself was a mixture of an unsaturated polyester and styrene in weight ratio 67:33, such that the polymerisable composition according to the present invention had the composition, unsaturated urethane: methyl methacrylate: unsaturated polyester: styrene, 32: 48: 13.4: 6.6 parts by weight. The polyester had a maleate: orthopthalate:isophthalate ratio of 1: 1: 0. The polymerisable composition was clear.

The polymerisable composition was then polymerised and the polymer analysed according to procedure (B) in Examples 16-22. The polymer was clear and was found to contain 2.2% w/w unreacted methyl methacrylate and 0.01% w/w unreacted styrene compared with 5.8% w/w and 0% w/w respectively in the comparative example to which the copolymerisable substance had not been added.

EXAMPLES 26-29

These examples illustrate the variation in free methacrylate content obtained on polymerisation of polymerisable compositions according to the present invention in which the ratio of unsaturated urethane and suitable methacrylate monomer to copolymerisable substance is varied.

The unsaturated urethane/methyl methacrylate mixture was prepared by the process described in Example 1. The copolymerisable substance was an unsaturated polyester/styrene mixture having the composition described in Example 16.

Each polymerisable composition was initiated at approximately 20° C. with 1.5% w/w dibenzoyl peroxide and 0.5% w/w N,N-dimethyl-p-toluidine and was cast into a glass cell of internal dimension 120 cms ×120 cms ×3 cms where polymerisation occurred. Ten minutes after casting the polymer sheets were demoulded and cut into two roughly equal portions. The first portion of each, without further treatment was cut into squares approximately 5 mm ×5 mm.

Samples of these portions, weighing approximately 2.0-2.5 grams, were weighed accurately and immersed in approximately 20 mls of chloroform for 3 days. The solids were then filtered out of the chloroform which were made up to 25 ml in a volumetric flask and this solution was analysed for free methyl methacrylate and styrene by gas liquid chromatography.

The second portion of each polymer sheet was post-cured at 110° C. for 1 hour and analysed as for the first portion.

The results of the analysis are shown in Table 7.

EXAMPLE 30

This example illustrates a polymerisable composition according to the present invention containing a thermoplastic.

A polyisocyanate (354 grams) having an average isocyanate functionality of 2.6 (Suprasec (RTM) DND), and 2-hydroxyethyl methacrylate (354 grams; containing p-methoxyphenol (300 ppm)) were added to methyl methacrylate (1023 grams) in a stirred vessel. A copolymer (170 grams; weight ratio butyl acrylate: methyl methacrylate of 45:55) was added to the vessel and dispersed by stirring. Dibutyl tin dilaurate (7 grams) was added and the reaction mixture exothermed to 70° C., while the copolymer dissolved. On cooling a clear amber liquid was obtained.

In a comparative test, to a portion of the said liquid was added dibenzoyl peroxide (1.5% w/w) and N,N-dimethyl-p-toluidine (0.5% w/w). The catalysed composition was immediately charged to a mould of internal dimensions 120 mm ×120 mm ×3 mm and internal faces of chromed steel, it was maintained at 60° C. while polymerisation occurred. After 3 minutes demoulding was carried out and after a further 15-20 minutes, a portion of the product was cut into squares and the unreacted methyl methacrylate content thereof was determined by the procedure described in Examples 26-29.

A second portion of the clear, amber liquid was mixed in the weight ratio 80:20 with an unsaturated polyester/styrene mixture (CS 1). The polymerisable composition so formed was polymerised, demoulded and analysed as described above.

The quantities of the unreacted monomers found in the portion are shown in Table 8.

TABLE 8

| Example | % w/w Unreacted monomer in product | |
|---|---|---|
| No | Methyl methacrylate | Styrene |
| 30 | 3.3 | 0.053 |
| CT | 4.9 | a | a: Not determined
CT: Comparative test

EXAMPLE 31

This example describes the preparation of a glass fibre laminate in which the matrix is a polymerisable composition according to the present invention.

In a comparative test, a laminate was prepared by sandwiching two plies of "Unifilo" (RTM) continuous filament glass mat between two single plies of "Firet" (RTM) polyester surface veil and laying the composite mat in one half of a two part polished aluminium mould heated to a set temperature. The mould cavity was then

TABLE 7

| | Composition (p.b.w.) | | Free monomer in polymer (% w/w) | | | |
|---|---|---|---|---|---|---|
| | Unsaturated | | At demould | | After post-cure | |
| Ex No | urethane/methyl methacrylate | Unsaturated polyester/styrene | Methyl methacrylate | Styrene | Methyl methacrylate | Styrene |
| CT | 100 | 0 | 2.54 | 0 | 2.04 | 0 |
| 26 | 80 | 20 | 0.93 | a | 0.43 | a |
| 27 | 60 | 40 | 0.59 | 0.083 | 0.23 | a |
| 28 | 40 | 60 | 0.71 | 0.137 | 0.21 | 0.023 |
| 29 | 20 | 80 | 0.50 | 1.29 | 0.44 | 0.192 |
| CT | 0 | 100 | 0 | 3.6 | 0 | 0.51 |

CT: Comparative test
a: Not determined closed. A slurry of the clear amber liquid prepared in Example 13 and calcium carbonate filler ("Durcal" (RTM) 5) in weight ratio 65:35 was initiated at 20° by adding 1.5% w/w dibenzoyl peroxide amd 0.5% w/w N,N-dimethyl p-toluidine. The mixture was then injected into the mould cavity at 80 psi air pressure. After 3 minutes residence time the laminates were demoulded. Laminates were made with the mould at 60° C. and 80° C.

In Example 31, the procedure given in the comparative test was repeated except that the polymerisable composition prepared in Example 30 was used instead of the clear amber liquid. The results are given in Table 9.

TABLE 9

| Example No | Mould Temperature (°C.) | Gloss meter reading | | | |
|---|---|---|---|---|---|
| | | At demould | 1 week after demould | 4 weeks after demould | 12 weeks after demould |
| 31 | 60 | 78 | 76 | 76 | 73 |
|    | 80 | 80 | 80 | 79 | 79 |
| CT | 60 | 76 | 70 | 70 | 62 |
|    | 80 | 82 | 80 | 77 | 73 |

EXAMPLES 32 AND 33

These Examples illustrate the improvement in mechanical properties associated with the use of an unsaturated polyester in polymerisable compositions according to the present invention.

Polymerisable compositions as prepared in Example 2 and 32 were initiated with 1% w/w benzoyl peroxide and 0.2% w/w N,N-dimethyl-p-toluidine and cast into glass cells of internal dimensions 250 mm ×250 mm ×2.5 mm. After demould the products were cured at 115° C. for 40 hours and the properties, shown in Table 10 were determined.

In a comparative test the above procedure was repeated except that Resin A was used instead of the polymerisable composition described in Example 2.

TABLE 10

| Example No | Polymerisable Composition prepared in | Unnotched specimens | | | | | | Notched specimens | | |
|---|---|---|---|---|---|---|---|---|---|---|
| | | Tensile Modulus Gpa | Yield Strain | Failure Strain | Yield Stress mPa | Failure Stress mPa | Charpy Impact kJ/m² | Failure Strain | Failure Stress mPa | Charpy Impact kJ/m² |
| 32 | Example 2 | 2.29 | 0.058 | 0.068 | 67.5 | | 30 | 0.026 | 55.7 | 5.8 |
| 33 | Example 22 | 3.2 | | 0.030 | | 67 | | | | |
| CT | Example 1 Resin A | 1.95 | 0.075 | 0.079 | 55.8 | | 26 | 0.026 | 42.4 | 6.4 |

CT: Comparative test.

EXAMPLES 34-38

These examples illustrate the increase in shelf life of polymerisable compositions according to the present invention, prepared as in Example 3 (Resin A and CSI), containing an accelerator and to which a reagent which neutralised the free acid in the unsaturated polyester used as copolymerisable substance had been added.

In Example 34, the unsaturated polyester and the unsaturated polyurethane were mixed, Durcal 5 (100 grams) was dipersed in the solution and N,N-dimethyl-p-toluidine was added.

In Example 35, triethylamine (0.5 gram) was dissolved in the unsaturated polyester (15 grams), the unsaturated urethane (85 gram) and then N,N-dimethyl-p-toluidine (0.5 grams) were added.

In Example 36, aqueous sodium hydroxide (2.0 grams of 10% w/w solution) was added to the unsaturated polyester (15 grams), the unsaturated urethane (85 grams) and the N,N-dimethyl-p-toluidine (0.5 grams) were added.

In Examples 37 and 38, Example 35 was repeated except that diethylamine (0.26 grams and 0.19 grams respectively) was used instead of triethylamine.

In a comparative test, the unsaturated polyester (15 grams) followed by N,N-dimethyl-p-toluidine (0.5 grams) was added to the unsaturated urethane (85 grams).

The results are shown in Table 11.

TABLE 11

| Example No | Reagent | Stability at | |
|---|---|---|---|
| | | 20° C. | 38° C. |
| 34 | CaCO₃ | 6 days | 2 months |
| 35 | Et₃N | a | 3½ months |
| 36 | NaOH | a | 1 month |
| 37 | Et₂NH | a | >8 months |
| 38 | Et₂NH | a | 6 months |
| CT | | 2 days | <16 hours | a: Not determined.
CT: Comparative test.

EXAMPLES 39-44

These examples illustrate the variation in shelf life of polymerisable compositions according to the present invention containing an accelerator, in which the free carboxyl groups of a polyester had been reacted with a range of amounts of triethylamine.

In the Examples Resin A, prepared as in Example 1 (80 parts by weight) was mixed with CSI, as described in Example 1 (20 parts by weight); triethylamine and then the accelerator (n,n-dimethyl-p-toluidine) (0.5 parts by weight) were added to the solution.

The results are shown in Table 12.

TABLE 12

| Example No | Et₃N (parts by weight) | Stability at | |
|---|---|---|---|
| | | 20° C. | 38° C. |
| CT | 0 | 8 days | <16 hours |
| 39 | 0.68 | a | 1.5 months |
| 40 | 0.60 | a | 1.5 months |
| 41 | 0.50 | >5 months | 3.5 months |
| 42 | 0.40 | a | 3 months |
| 43 | 0.30 | a | 1 month |
| 44 | 0.20 | a | 3 days |

CT: Comparative test
a: Not determined

EXAMPLES 45-48

These examples illustrate the use of a range of unsaturated polyester resins as copolymerisable substance and the effect of addition of triethylamine on the shelf life of polymerisable compositions according to the present invention comprising such polyesters. The polyester (20 grams) (dissolved in styrene at a polyester to styrene ratio of 2:1) was added to Resin A (80 grams; prepared as in Example 1) with stirring. Triethylamine and then N,N-dimethyl-p-toluidine (0.5 grams) were then added with stirring. The results are shown in Table 13.

TABLE 13

| Example No | Unsaturated polyester | | | Acid value mgKOH/g | Et$_3$N | Stability at | |
|---|---|---|---|---|---|---|---|
| | M: | O: | I | | | 20° C. | 38° C. |
| CT42 | 1: | 1: | 0 | 19 | 0 | 8 days | <16 hours |
| 42 | 1: | 1: | 0 | 19 | 0.5 | >5 months | 3½ months |
| CT43 | 3: | 1: | 0 | 24 | 0 | 7 days | <16 hours |
| 43 | 3: | 1: | 0 | 24 | 0.6 | 3 months | 3 weeks |
| CT44 | 3: | 0: | 1 | 26 | 0 | 8 days | <16 hours |
| 44 | 3: | 0: | 1 | 26 | 0.65 | 3 months | 5 weeks |
| CT45 | 2: | 1: | 0 | 30 | 0 | 4 days | <16 hours |
| 45 | 2: | 1: | 0 | 30 | 0.8 | >4 weeks | 12 days |

M: Maleic acid
O: Orthophthalic acid
I: Isophthalic acid
CT: Comparative test

We claim:

1. A polymerisable composition which comprises
(a) an unsaturated urethane which is a polyurethane polyacrylate or polymethacrylate resin derived from a hydroxyalkyl acrylate or methacrylate by reaction of the hydroxyl groups thereof with the isocyanate groups of,
   (i) a polymethylene polyphenyl polyisocyanate free from urethane groups and having a number average isocyanate functionality of at least 2.2 or
   (ii) a urethane polyisocyanate derived from a polymethylene polyphenyl polyisocyanate by reaction thereof with the hydroxyl groups of a polyhydroxy compound, the said urethane polyisocyanate having a number average isocyanate functionality of at least 2.2;
(b) a methyl methacrylate monomer; and
(c) at least one ethylenically unsaturated polyester which,
   (i) contains at least one ethylenically unsaturated group,
   (ii) is copolymerisable with the mixture of the unsaturated urethane and the methyl methacrylate monomer and
   (iii) has a polymerisation reactivity, both with the aforesaid mixture and itself, such that the concentration of the methyl methacrylate monomer at demould of the product prepared on polymerisation of the polymerisable composition is less than the concentration of the methacrylate monomer which would be present in the product obtained on polymerisation of the polymerisable composition in the absence of (c) from the polymerisation composition.

2. A polymerisable composition as claimed in claim 1 which comprises an inorganic filler.

3. A polymerisable composition as claimed in claim 1 wherein the hydroxyalkyl acrylate or methacrylate contains from 2 to 4 carbon atoms in the hydroxalkyl group.

4. A polymerisable composition as claimed in claim 1 wherein, where the polyurethane polyacrylate or polymethacrylate is derived from a urethane polyisocyanate, the urethane polyisocyanate is derived by reaction of a polyhydroxy compound with a polymethylene polyphenyl polyisocyanate which has an isocyanate functionality greater than 2.2.

5. A polymerisable composition as claimed in claim 1 wherein the isocyanate functionality of the polyisocyanate or urethane polyisocyanate is in the range from 2.5 to 3.0.

6. A polymerisable composition as claimed in claim 1 wherein the polyhydroxy compound, where used, is a diol or triol.

7. A polymerisable composition as claimed in claim 1 wherein the proportion of unsaturated urethane is in the range from 10 to 90 parts by weight per hundred total parts by weight of unsaturated urethane plus methyl methacrylate monomer.

8. A polymerisable composition as claimed in claim 1 wherein the unsaturated polyester is in admixture with styrene.

9. A polymerisable composition as claimed in claim 1 wherein the concentration of the polyester substance (c) is between 5 and 95% of the total weight of unsaturated urethane methacrylate monomer and said polyester.

* * * * *